(12) United States Patent
Eckhoff et al.

(10) Patent No.: US 7,116,778 B2
(45) Date of Patent: Oct. 3, 2006

(54) ADAPTIVE LINEFEED CONTROL FOR VARYING LOAD ON A SUBSCRIBER LOOP

(75) Inventors: Christopher D. Eckhoff, Austin, TX (US); Marius Goldenberg, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 386 days.

(21) Appl. No.: 10/260,696

(22) Filed: Sep. 30, 2002

(65) Prior Publication Data
US 2004/0062384 A1 Apr. 1, 2004

(51) Int. Cl.
*H04M 19/00* (2006.01)

(52) U.S. Cl. .................. 379/399.01; 379/413; 379/324

(58) Field of Classification Search ........... 379/399.01, 379/400, 413.01, 322, 323, 395.01, 176, 379/186, 324
See application file for complete search history.

(56) References Cited

U.S. PATENT DOCUMENTS

| | | | |
|---|---|---|---|
| 4,476,350 A | 10/1984 | Aull et al. | |
| 4,617,426 A | 10/1986 | Johansson et al. | |
| 5,323,461 A | 6/1994 | Rosenbaum et al. | |
| 5,619,567 A | 4/1997 | Apfel | |
| 5,661,794 A | 8/1997 | Rosch et al. | |
| 5,737,411 A | 4/1998 | Apfel et al. | |
| 5,854,550 A | 12/1998 | Knollman | |
| 5,854,839 A | 12/1998 | Chen et al. | |
| 5,878,133 A | 3/1999 | Zhou et al. | |
| 5,881,129 A | 3/1999 | Chen et al. | |
| 5,912,513 A * | 6/1999 | Hollenbach et al. | 307/44 |
| 5,926,544 A | 7/1999 | Zhou | |
| 6,178,241 B1 * | 1/2001 | Zhou | 379/382 |
| 6,201,865 B1 | 3/2001 | Dupuis et al. | |
| 6,301,358 B1 * | 10/2001 | Chen et al. | 379/413 |

OTHER PUBLICATIONS

Si3210 ProSLIC(TM) Programmable CMOS SLIC/Codec with Ringing and Battery Voltage Generation Product Brief, Silicon Laboratories Inc., 2 pages (Jan. 2000).
Si321x Hardware Reference Guide, Application Note 34, Silicon Laboratories Inc., pp. 1-10 (Rev. 0.2, Nov. 2000).
Si321x User's Quick Reference Guide, Application Note 35, Silicon Laboratories Inc., pp. 1-8 (Rev. 0.4, Jul. 2001).
Si321x Linefeed Power Monitoring and Protection, Application Note 47, Silicon Laboratories Inc., pp. 1-6 (Rev. 0.1, Sep. 2001).
Si3210/Si3211/Si3212 ProSLIC(TM) Programmable CMOS SLIC/Codec with Ringing/Battery Voltage Generation Datasheet, Silicon Laboratories Inc., pp. 1-122 (Preliminary Rev. 1.11, Sep. 2001).

* cited by examiner

*Primary Examiner*—Sinh Tran
*Assistant Examiner*—Walter F Briney, III
(74) *Attorney, Agent, or Firm*—Davis & Associates; William D. Davis

(57) ABSTRACT

A linefeed on a subscriber loop is generated to generate a current on the subscriber loop. Whether a relationship between a voltage on the subscriber loop and a threshold voltage for an identified range of voltages satisfies a condition is identified. The linefeed on the subscriber loop is controlled to modify the current on the subscriber loop in response to identifying that the relationship between the voltage on the subscriber loop and the threshold voltage for the identified range of voltages satisfies the condition to help generate the voltage on the subscriber loop in the identified range of voltages. The identifying and controlling are continued to help generate and maintain the voltage on the subscriber loop in the identified range of voltages.

18 Claims, 8 Drawing Sheets

ADAPTIVE LINEFEED CONTROL FOR VARYING LOAD ON A SUBSCRIBER LOOP

BACKGROUND

1. Field of the Invention

The present invention relates generally to the field of telecommunications. More particularly, the present invention relates to the field of linefeed control for subscriber loops.

2. Description of Related Art

Subscriber line (or loop) interface circuits (SLICs) are typically found in or near the central office exchange of a telecommunications network.

One typical SLIC provides a communications interface between a digital switching network for a central office exchange and an analog subscriber line. The analog subscriber line connects to subscriber equipment, such as a subscriber station or telephonic instrument for example, at a location remote from the central office exchange. The analog subscriber line and subscriber equipment form a subscriber loop.

The SLIC detects and transforms voiceband communications transmitted from the subscriber equipment in the form of low voltage analog signals on the subscriber loop into corresponding digital data for transmission to the digital switching network. For bi-directional communication, the SLIC also transforms digital data received from the digital switching network into corresponding low voltage analog signals for transmission on the subscriber loop to the subscriber equipment.

The SLIC also typically generates a linefeed on the subscriber loop to power the subscriber equipment. When a conventional telephone, for example, on the subscriber loop is off-hook, the SLIC should provide adequate direct current (DC) feed on the subscriber loop to help ensure proper operation of the telephone. When more than one telephone is off-hook on the same subscriber loop, however, one or more of the off-hook telephones may not receive adequate power.

The SLIC may be designed to provide adequate power to accommodate a larger load on the subscriber loop. The SLIC, however, would then unnecessarily waste power whenever a smaller load, such as only one off-hook telephone for example, is on the subscriber loop. Also, the SLIC would have to be designed to dissipate a maximum possible amount of wasted power to account for times when only a smaller load is on the subscriber loop. This maximum possible amount of wasted power typically increases as the load the SLIC is designed to support increases.

The SLIC may alternatively be designed to provide a resistive DC feed on the subscriber loop so that the power supplied to the subscriber equipment on the subscriber loop is generally proportional to the DC load on the subscriber loop. As additional telephones, for example, are switched off-hook on the same subscriber loop, the increasing DC load presented on the subscriber loop will draw from the SLIC an increasing amount of power generally in proportion to the DC load. Providing a typical resistive DC feed on a subscriber loop, however, generally elevates power dissipation for all DC load conditions and perturbs voice impedance synthesis performed by the SLIC.

SUMMARY

A method comprises generating a linefeed on a subscriber loop to generate a current on the subscriber loop, identifying whether a relationship between a voltage on the subscriber loop and a threshold voltage for an identified range of voltages satisfies a condition, controlling the linefeed on the subscriber loop to modify the current on the subscriber loop in response to identifying that the relationship between the voltage on the subscriber loop and the threshold voltage for the identified range of voltages satisfies the condition to help generate the voltage on the subscriber loop in the identified range of voltages, and continuing the identifying and controlling to help generate and maintain the voltage on the subscriber loop in the identified range of voltages.

An apparatus comprises linefield driver circuitry to generate a linefield on a subscriber loop to generate a current on the subscriber loop, subscriber loop sensing circuitry to sense one or more voltages on the subscriber loop, and adaptive linefeed control circuitry to monitor a voltage based on the sensed voltage(s), to identify whether a relationship between the monitored voltage and a threshold voltage for an identified range of voltages satisfies a condition, to control the linefeed on the subscriber loop to modify the current on the subscriber loop in response to identifying that the relationship between the monitored voltage and the threshold voltage for the identified range of voltages satisfies the condition to help generate the monitored voltage in the identified range of voltages, and to continue the monitoring, identifying, and controlling to help generate and maintain the monitored voltage in the identified range of voltages.

The adaptive linefeed control circuitry may modify the current limit for the subscriber loop by decreasing the current limit if the monitored voltage is greater than the threshold voltage. The adaptive linefeed control circuitry may modify the current limit for the subscriber loop by increasing or decreasing the current limit by a predetermined amount.

An apparatus comprises means for generating a linefeed on a subscriber loop to generate a current on the subscriber loop, means for identifying whether a relationship between a voltage on the subscriber loop and a threshold voltage for an identified range of voltages satisfies a condition, means for controlling the linefeed on the subscriber loop to modify the current on the subscriber loop in response to identifying that the relationship between the voltage on the subscriber loop and the threshold voltage for the identified range of voltages satisfies the condition to help generate the voltage on the subscriber loop in the identified range of voltages, and means for continuing the identifying and controlling to help generate and maintain the voltage on the subscriber loop in the identified range of voltages.

A machine-readable medium to store machine-executable instructions which, if executed by a machine, perform a method comprising generating a linefeed on a subscriber loop to generate a current on the subscriber loop, identifying whether a relationship between a voltage on the subscriber loop and a threshold voltage for an identified range of voltages satisfies a condition, controlling the linefeed on the subscriber loop to modify the current on the subscriber loop in response to identifying that the relationship between the voltage on the subscriber loop and the threshold voltage for the identified range of voltages satisfies the condition to help generate the voltage on the subscriber loop in the identified range of voltages, and continuing the identifying and controlling to help generate and maintain the voltage on the subscriber loop in the identified range of voltages.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

The following detailed description sets forth an embodiment or embodiments in accordance with the present invention for adaptive linefeed control for varying load on a subscriber loop.

Exemplary Subscriber Line Interface Circuit (SLIC) Environment

Figure 1:
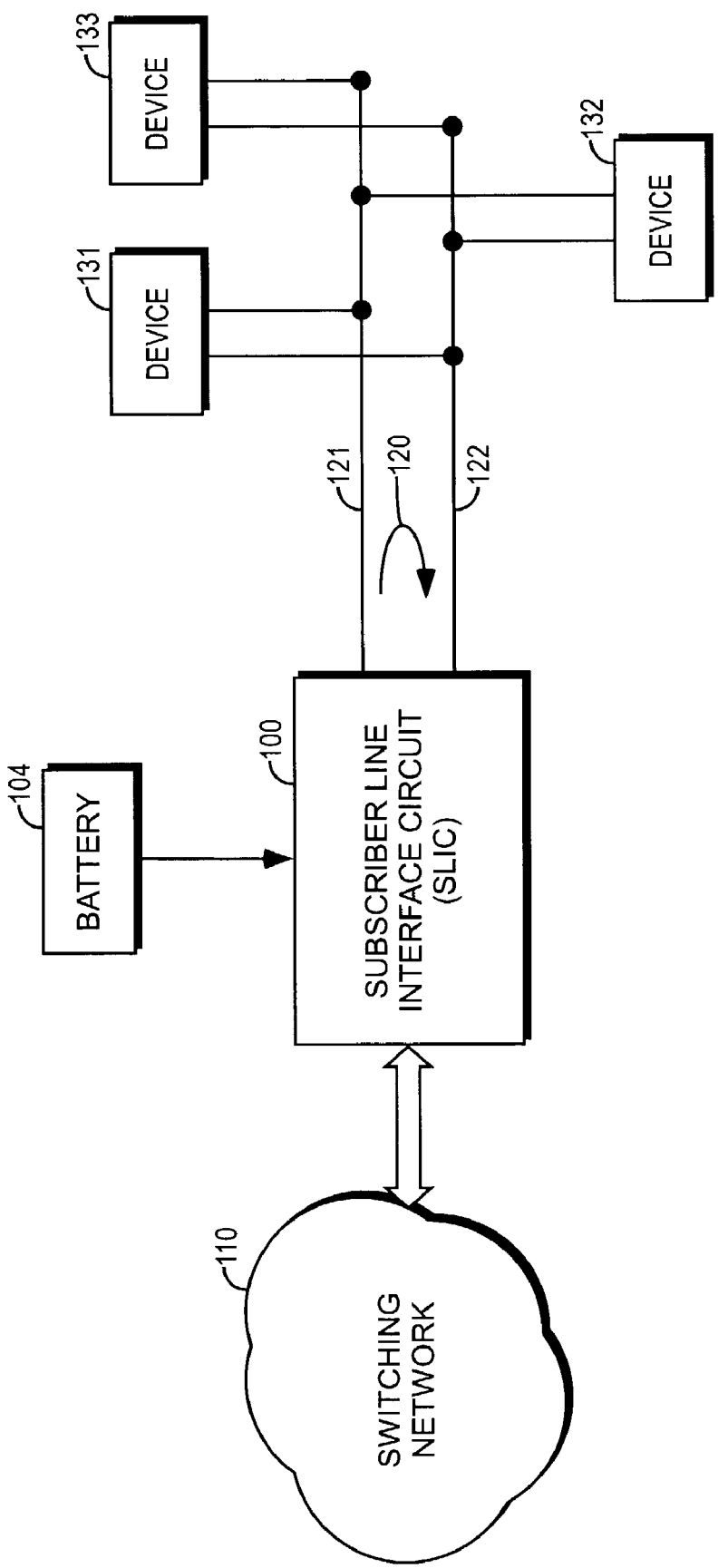
FIG. 1 illustrates, for one embodiment, a subscriber line interface circuit (SLIC) coupling multiple devices on a subscriber loop to a switching network.

FIG. 1 illustrates, for one embodiment, a subscriber line interface circuit (SLIC) 100. SLIC 100 provides a communications interface between a switching network 110 and a subscriber loop 120 having multiple devices 131, 132, and 133. Switching network 110 for one embodiment is a digital switching network for a larger telecommunications network. SLIC 100 may be used for any suitable application such as, for example, terminal adaptors, cable telephony, private branch exchange (PBX) systems, key telephone systems, wireless local loop, voice over Internet protocol (IP), and integrated access devices.

Subscriber loop 120 for one embodiment, as illustrated in FIG. 1, is defined by a first line 121, a second line 122, and one or more devices 131, 132, and/or 133. For one embodiment where SLIC 100 provides an analog telephone interface, first line 121 corresponds to a tip line and second line 122 corresponds to a ring line.

Devices 131, 132, and 133 are electrically coupled in a parallel relationship between first line 121 and second line 122. Each device 131, 132, and 133 may comprise any suitable circuitry to communicate with SLIC 100 in any suitable manner. SLIC 100 and each device 131, 132, and 133 for one embodiment may transmit and/or receive any suitable analog signals. For one embodiment, each device 131, 132, and 133 is an analog telephonic device. For one embodiment, each device 131, 132, and 133 is an analog telephone. Although described in the context of three devices 131, 132, and 133, subscriber loop 120 may have any suitable number of devices, such as one, two, four, or more.

SLIC 100 may receive communications in the form of signals on subscriber loop 120 from device 131, 132, and/or 133 and forward the received signals or transform and transmit the received signals to switching network 110. SLIC 100 may receive communications in the form of signals from switching network 110 and forward the received signals or transform and transmit the received signals on subscriber loop 120 to device 131, 132, and/or 133.

For one embodiment where SLIC 100 provides an analog telephone interface to subscriber loop 120 and where switching network 110 is a digital switching network, SLIC 100 receives voiceband communications transmitted from device 131, 132, and/or 133 in the form of low voltage analog signals on subscriber loop 120 and transforms them into corresponding digital data for transmission to switching network 110. For bi-directional communication, SLIC 100 also transforms digital data received from switching network 110 into corresponding low voltage analog signals for transmission on subscriber loop 120 to device 131, 132, and/or 133.

SLIC 100 may also transmit on subscriber loop 120 to device 131, 132, and/or 133 and/or receive on subscriber loop 120 from device 131, 132, and/or 133 any suitable handshaking or control signals.

SLIC 100 for one embodiment may comprise any suitable circuitry to perform any suitable BORSCHT functions and/or any other suitable functions. BORSCHT is an acronym for battery feed, overvoltage protection, ring, supervision, coder/decoder (codec), hybrid, and test.

SLIC 100 may perform the battery feed function, for example, to provide power to device 131, 132, and/or 133 on subscriber loop 120. SLIC 100 for one embodiment receives power from a battery 104, as illustrated in FIG. 1, to provide power over subscriber loop 120. SLIC 100 for another embodiment may receive power from any other suitable source to provide power over subscriber loop 120.

SLIC 100 may perform the overvoltage protection function, for example, to protect any circuitry in or coupled to switching network 110 against voltage transients that may occur on subscriber loop 120.

SLIC 100 may perform the ring function, for example, to signal device 131, 132, and/or 133 for call progress. Where device 131, for example, is a telephone, SLIC 100 may use the ring function to ring the telephone.

SLIC 100 may perform the supervision function, for example, to detect service requests. SLIC 100 may perform the supervision function to detect when device 131, 132, and/or 133 is activated on subscriber loop 120. Where device 131, for example, is a conventional telephone, SLIC 100 may detect when the telephone is switched off-hook. SLIC 100 may also perform the supervision function, for example, to supervise calls in progress and to detect dialing input signals.

SLIC 100 may perform the codec function, for example, to encode data signals in a manner suitable for transmission by switching network 110 and to decode data signals received from switching network 110. SLIC 100 for one embodiment may use pulse code modulation, for example, to encode voiceband data, for example.

SLIC 100 may perform the hybrid function, for example, to adapt two-wire signaling, for example, for subscriber loop 120 into separate transmit and receive signaling, for example, for switching network 110.

SLIC 100 may perform the test function, for example, to test for faults and/or to indicate faults that may exist in subscriber loop 120 and/or in SLIC 100 itself.

Adaptive Linefeed Control

In performing the battery feed function, SLIC 100 for one embodiment may generate a linefeed over subscriber loop 120 to power device 131, 132, and/or 133.

Because any one, two, or all three of devices 131, 132, and 133 may be active on subscriber loop 120 at a given time, the load on subscriber loop 120 may vary as one or more devices 131, 132, and/or 133 are activated and deactivated. Generally, the load on subscriber loop 120 increases as more devices are activated on subscriber loop 120 and decreases as more devices are deactivated on subscriber loop 120.

As one example where devices 131, 132, and 133 are conventional telephones, any one telephone may be activated by switching the telephone from the on-hook state to the off-hook state to initiate a call or to receive an incoming call. The first off-hook telephone presents an initial load on subscriber loop 120. When a second telephone on subscriber loop 120 is switched to the off-hook state while the first telephone is still off-hook, both the first and second off-hook telephones present on subscriber loop 120 a load larger than the load initially presented by only the first off-hook telephone. The load on subscriber loop 120 may be further increased by switching the third telephone off-hook while the first and second telephones are still off-hook. As each telephone is deactivated by being switched to the on-hook state, the load on subscriber loop 120 decreases.

SLIC 100 for one embodiment adaptively controls the linefeed on subscriber loop 120 to account for variations in load on subscriber loop 120. SLIC 100 for one embodiment generates a linefeed on subscriber loop 120 to generate a current on subscriber loop 120 and monitors the load of subscriber loop 120. SLIC 100 for one embodiment then controls the linefeed on subscriber loop 120 to modify the current on subscriber loop 120 based on the monitored load. SLIC 100 for one embodiment may increase the current provided by the linefeed as the monitored load increases and may decrease the current provided by the linefeed as the monitored load decreases. In this manner, SLIC 100 may provide adequate power not only when only one device 131, 132, or 133 is activated on subscriber loop 120 but also when multiple devices 131, 132, and/or 133 are activated on subscriber loop 120 with minimized or reduced concern for having to dissipate excess power.

SLIC 100 may adaptively control the linefeed on subscriber loop 120 to account for variations in load on subscriber loop 120 in any suitable manner. For one embodiment, SLIC 100 may adaptively control the linefeed on subscriber loop 120 in accordance with a flow diagram 200 of FIG. 2.

For block 202 of flow diagram 200, SLIC 100 sets a range of subscriber loop metallic voltages $V_M$. The metallic voltage $V_M$ for subscriber loop 120 is the voltage difference between first line 121 and second line 122 of subscriber loop 120. SLIC 100 for one embodiment may attempt to generate and maintain a subscriber loop metallic voltage $V_M$ in the set range despite variations in the load on subscriber loop 120. Any suitable range of subscriber loop metallic voltages $V_M$ may be used.

SLIC 100 for one embodiment may set the range of subscriber loop metallic voltages $V_M$ by storing in one or more registers of SLIC 100 one or more values that may be used to identify an upper metallic voltage threshold $V_{UTH}$ and a lower metallic voltage threshold $V_{LTH}$. SLIC 100 for one embodiment may store the upper metallic voltage threshold $V_{UTH}$ and the lower metallic voltage threshold $V_{LTH}$ in one or more registers of SLIC 100. SLIC 100 for another embodiment may store in one or more registers of SLIC 100 a target subscriber loop metallic voltage $V_T$, an upper voltage offset amount or percentage from the target subscriber loop metallic voltage $V_T$ to identify an upper metallic voltage threshold $V_{UTH}$, and a lower voltage offset amount or percentage from the target subscriber loop metallic voltage $V_T$ to identify a lower metallic voltage threshold $V_{LTH}$. The upper voltage offset amount or percentage and the lower voltage offset amount or percentage for one embodiment may be the same, allowing both the upper and lower voltage offset amounts or percentages to be stored with only a single value. The one or more values that may be used to identify an upper metallic voltage threshold $V_{UTH}$ and a lower metallic voltage threshold $V_{LTH}$ may be predetermined and/or programmable.

For block 204, SLIC 100 sets a subscriber loop current limit $I_{LIM}$ to an initial value $I_{LIM1}$. SLIC 100 for one embodiment may attempt to generate and maintain on subscriber loop 120 a current $I_{LOOP}$ approximately equal to a set current limit $I_{LIM}$ for a given load or range of loads on subscriber loop 120. The initial subscriber loop current limit $I_{LIM1}$ may have any suitable value. The initial subscriber loop current limit $I_{LIM1}$ for one embodiment has a value that would help provide adequate power for one or more activated devices 131, 132, and/or 133 on subscriber loop 120 with reduced or minimized concern for having to dissipate excess power.

SLIC 100 for one embodiment may set the initial subscriber loop current limit $I_{LIM1}$ by storing in one or more registers of SLIC 100 one or more values that may be used to identify the initial subscriber loop current limit $I_{LIM1}$. SLIC 100 for one embodiment may store the initial subscriber loop current limit $I_{LIM1}$ in a register of SLIC 100. The one or more values that may be used to identify an initial subscriber loop current limit $I_{LIM1}$ may be predetermined and/or programmable.

For block 206, SLIC 100 generates a subscriber loop open circuit metallic voltage $V_{OC}$. SLIC 100 for one embodiment may generate the subscriber loop open circuit metallic voltage $V_{OC}$ such that the metallic voltage $V_M$ for subscriber loop 120 is approximately equal to the subscriber loop open circuit metallic voltage $V_{OC}$ when subscriber loop 120 is in an open circuit state. Subscriber loop 120 for one embodiment is in an open circuit state when all devices 131, 132, and 133 on subscriber loop 120 are deactivated.

SLIC 100 may generate any suitable subscriber loop open circuit metallic voltage $V_{OC}$ in any suitable manner. SLIC 100 for one embodiment may generate a subscriber loop open circuit metallic voltage $V_{OC}$ in the range of approximately 0 volts (V) to approximately 90–100 volts (V). SLIC 100 for one embodiment may generate a subscriber loop open circuit metallic voltage $V_{OC}$ of approximately 48 volts (V), for example.

SLIC 100 for one embodiment may set the subscriber loop open circuit metallic voltage $V_{OC}$ by storing in one or more registers of SLIC 100 one or more values that may be used to identify the subscriber loop open circuit metallic voltage $V_{OC}$. SLIC 100 for one embodiment may store the subscriber loop open circuit metallic voltage $V_{OC}$ in a register of SLIC 100. The one or more values that may be used to identify a subscriber loop open circuit metallic voltage $V_{OC}$ may be predetermined and/or programmable.

When at least one device 131, 132, and/or 133 is activated on subscriber loop 120 for block 208, SLIC 100 for block 210 generates a linefeed on subscriber loop 120 to help power any activated device 131, 132, and/or 133. SLIC 100 for one embodiment may generate a linefeed on subscriber loop 120 using a current source to generate a current on subscriber loop 120. SLIC 100 for another embodiment may generate a linefeed on subscriber loop 120 by generating a suitable metallic voltage $V_M$ for subscriber loop 120. SLIC 100 for one embodiment may generate a direct current (DC) linefeed on subscriber loop 120.

SLIC 100 for one embodiment may maintain the subscriber loop open circuit metallic voltage $V_{OC}$ on first and second lines 121 and 122 for block 206. When activation of a device 131, 132, or 133 on subscriber loop 120 for block 208 closes the open circuit of subscriber loop 120, SLIC 100 consequently generates a linefeed on subscriber loop 120 for block 210.

Figure 3:
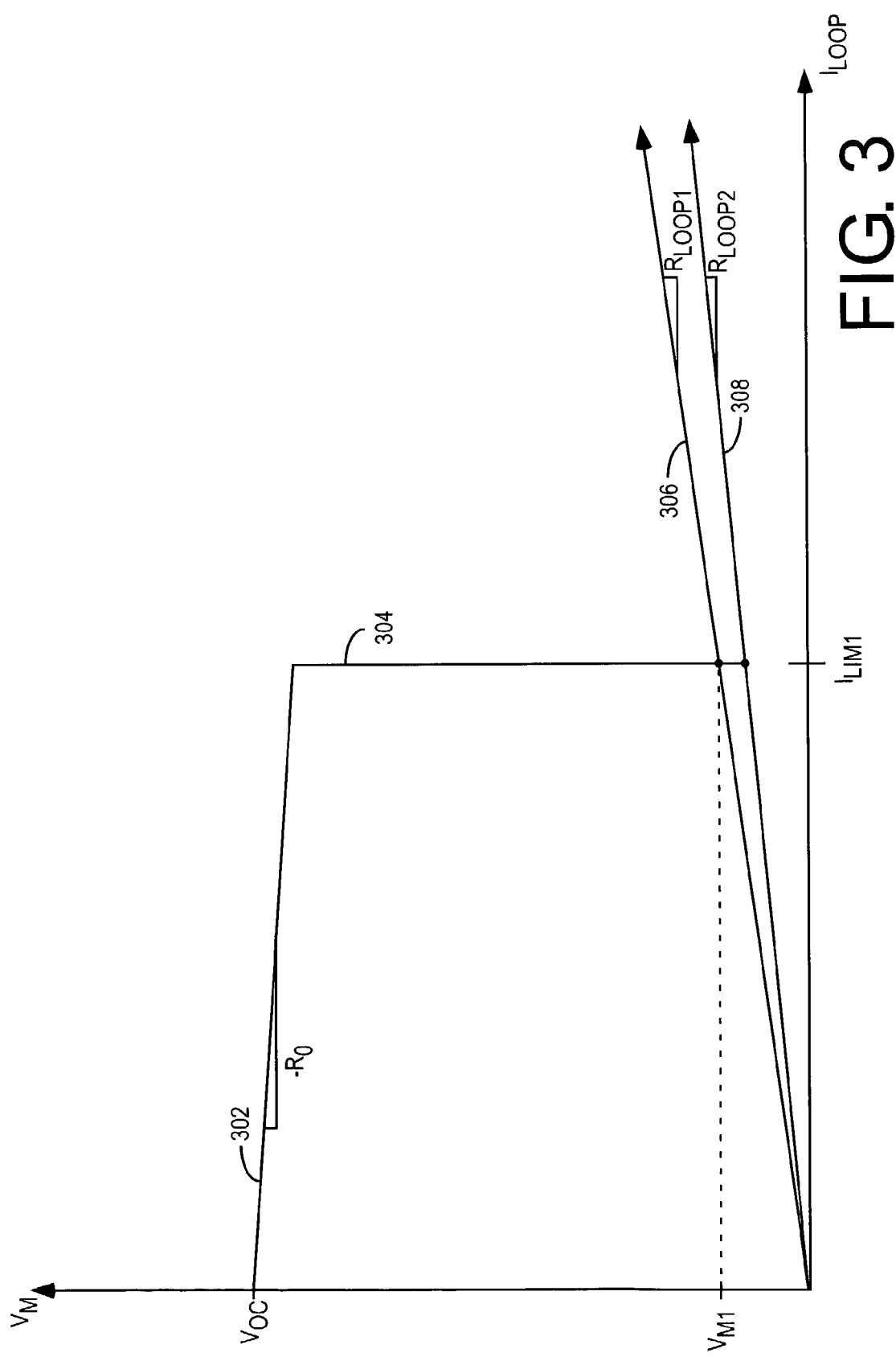
FIG. 3 illustrates, for one embodiment, an initial subscriber loop direct current (DC) linefeed characteristic.

FIG. 3 illustrates, for one embodiment, a characteristic of an initial subscriber loop direct current (DC) linefeed generated by SLIC 100. As illustrated in FIG. 3, SLIC 100 for one embodiment initially generates an open circuit metallic voltage $V_{OC}$ on subscriber loop 120. When SLIC 100 generates the linefeed on subscriber loop 120, the subscriber loop metallic voltage $V_M$ initially decreases generally linearly along a curve 302 as the subscriber loop current $I_{LOOP}$ increases due to an inherent DC output resistance $R_O$ of SLIC 100. The slope of curve 302 is approximately equal to the additive inverse of the DC output resistance $R_O$. SLIC 100 may have any suitable DC output resistance $R_O$.

For block 212, SLIC 100 controls the linefeed on subscriber loop 120 such that the subscriber loop current $I_{LOOP}$ is approximately equal to the set subscriber loop current limit $I_{LIM}$. SLIC 100 for one embodiment controls the linefeed on subscriber loop 120 to attempt to maintain a generally constant current $I_{LIM}$ to help provide adequate power for one or more activated devices 131, 132, and/or 133 on subscriber loop 120 with reduced or minimized concern for having to dissipate excess power.

SLIC 100 may control the linefeed on subscriber loop 120 for block 212 in any suitable manner. SLIC 100 for one embodiment controls a current source generating current on subscriber loop 120 to help maintain the subscriber loop current $I_{LOOP}$ at approximately the set subscriber loop current limit $I_{LIM}$. SLIC 100 for another embodiment may monitor the subscriber loop current $I_{LOOP}$ and/or the subscriber loop metallic voltage $V_M$ and may modify the subscriber loop metallic voltage $V_M$ based on the monitored subscriber loop current $I_{LOOP}$ and/or subscriber loop metallic voltage $V_M$ to help maintain the subscriber loop current $I_{LOOP}$ at approximately the set subscriber loop current limit $I_{LIM}$.

As illustrated in FIG. 3, SLIC 100 for one embodiment may control the linefeed on subscriber loop 120 for block 212 by controlling a current source to generate and maintain the subscriber loop current $I_{LOOP}$ on subscriber loop 120 at approximately the set subscriber loop current limit $I_{LIM}$. Because the subscriber loop current $I_{LOOP}$ and the subscriber loop metallic voltage $V_M$ have a generally linear relationship that depends on the total DC resistance $R_{LOOP}$ of subscriber loop 120, including any resistance presented on subscriber loop 120 by devices 131, 132, and 133, the subscriber loop metallic voltage $V_M$ will decrease along a curve 304 until the subscriber loop metallic voltage $V_M$ is approximately equal to the set subscriber loop current limit $I_{LIM1}$ multiplied by the total subscriber loop resistance $R_{LOOP}$, or until $V_M \approx I_{LIM1} * R_{LOOP}$. Where the total subscriber loop resistance has a value $R_{LOOP1}$, for example, as illustrated in FIG. 3, the subscriber loop metallic voltage $V_M$ decreases along curve 304 until the subscriber loop metallic voltage $V_M$ is approximately equal to $V_{M1} = I_{LIM1} * R_{LOOP1}$.

SLIC 100 for another embodiment may initially control the linefeed on subscriber loop 120 for block 212 when the subscriber loop current $I_{LOOP}$ nears, reaches, or attempts to exceed the initially set subscriber loop current limit $I_{LIM1}$. SLIC 100 may then modify the subscriber loop metallic voltage $V_M$ to help maintain the subscriber loop current $I_{LOOP}$ at approximately the set subscriber loop current limit $I_{LIM1}$. As illustrated in FIG. 3, SLIC 100 may decrease the subscriber loop metallic voltage $V_M$ along curve 304 until the subscriber loop metallic voltage $V_M$ is approximately equal to the set subscriber loop current limit $I_{LIM1}$ multiplied by the total subscriber loop resistance $R_{LOOP}$, or until $V_M \approx I_{LIM1} * R_{LOOP}$.

For block 214, SLIC 100 monitors the subscriber loop metallic voltage $V_M$. SLIC 100 for one embodiment may monitor the subscriber loop metallic voltage $V_M$ to help monitor the load on subscriber loop 120. The load on subscriber loop 120 may increase or decrease, for example, because of the activation or deactivation of any device 131, 132, and/or 133 on subscriber loop 120.

As one example where only one device 131, for example, is activated on subscriber loop 120, SLIC 100 initially controls the linefeed on subscriber loop 120 for block 212 such that the subscriber loop metallic voltage $V_M$ along curve 304 is approximately equal to $V_{M1} = I_{LIM1} * R_{LOOP1}$, where $R_{LOOP1}$ is the total subscriber loop resistance with device 131 as the only activated device on subscriber loop 120. The relationship between the subscriber loop metallic voltage $V_M$ and the subscriber loop current $I_{LOOP}$ with device 131 as the only activated device on subscriber loop 120 is represented in FIG. 3 by a generally linear curve 306 along which the subscriber loop metallic voltage $V_M$ increases as the subscriber loop current $I_{LOOP}$ increases. The slope of curve 306 is approximately equal to the total subscriber loop resistance $R_{LOOP1}$.

When another device 132, for example, is activated on subscriber loop 120 and increases the load on subscriber loop 120, the total subscriber loop resistance $R_{LOOP}$ decreases. The relationship between the subscriber loop metallic voltage $V_M$ and the subscriber loop current $I_{LOOP}$ with both devices 131 and 132 as the only activated devices on subscriber loop 120 is represented in FIG. 3 by a generally linear curve 308. The subscriber loop metallic voltage $V_M$ increases along curve 308 as the subscriber loop current $I_{LOOP}$ increases yet at a slower rate as compared to curve 306. The slope of curve 308 is approximately equal to the total subscriber loop resistance $R_{LOOP2}$, where $R_{LOOP2}$ is the total subscriber loop resistance with both devices 131 and 132 as the only activated devices on subscriber loop 120.

Although described as having a varying load due to the activation and deactivation of devices 131, 132, and/or 133, subscriber loop 120 may also have a varying load due to, for example, any variation in the load presented by any device 131, 132, and/or 133 on subscriber loop 120 while the device 131, 132, and/or 133 is activated.

For a given subscriber loop current $I_{LOOP}$, such as the set current limit $I_{LIM}$ for example, the subscriber loop metallic voltage $V_M$ decreases as the load on subscriber loop 120 increases and increases as the load on subscriber loop 120 decreases. SLIC 100 for one embodiment may therefore monitor the load on subscriber loop 120 by monitoring the subscriber loop metallic voltage $V_M$ at a given subscriber loop current $I_{LOOP}$. SLIC 100 for one embodiment may then increase the set subscriber loop current limit $I_{LIM}$ as the monitored subscriber loop metallic voltage $V_M$ decreases to increase the amount of power provided by the linefeed. SLIC 100 for one embodiment may decrease the set subscriber loop current limit $I_{LIM}$ as the monitored subscriber loop metallic voltage $V_M$ increases to decrease the amount of power provided by the linefeed.

SLIC 100 for one embodiment may monitor the subscriber loop metallic voltage $V_M$ for block 214 to identify a relationship between the subscriber loop metallic voltage $V_M$ and a threshold voltage. SLIC 100 for one embodiment may monitor the subscriber loop metallic voltage $V_M$ to identify a relationship between the subscriber loop metallic voltage $V_M$ and the set range of subscriber loop metallic voltages $V_M$. SLIC 100 may, for example, identify whether the subscriber loop metallic voltage $V_M$ is greater than the upper metallic voltage threshold $V_{UTH}$ and less than the lower metallic voltage threshold $V_{LTH}$. In this manner, hysteresis is introduced into the linefeed.

For block 216, SLIC 100 for one embodiment may identify whether the monitored subscriber loop metallic voltage $V_M$ is less than the lower metallic voltage threshold $V_{LTH}$ for the set range of subscriber loop metallic voltages $V_M$. Although described as identifying whether the monitored subscriber loop metallic voltage $V_M$ is less than the lower metallic voltage threshold $V_{LTH}$, SLIC 100 may identify whether the monitored subscriber loop metallic voltage $V_M$ and the lower metallic voltage threshold $V_{LTH}$ satisfy any suitable condition. SLIC 100 for another embodiment may identify whether the monitored subscriber loop metallic voltage $V_M$ is less than or equal to, is approaching, or is about to exceed the lower metallic voltage threshold $V_{LTH}$.

If the monitored subscriber loop metallic voltage $V_M$ is, for example, less than the lower metallic voltage threshold $V_{LTH}$ for the set range of subscriber loop metallic voltages $V_M$, SLIC 100 for block 218 increases the set subscriber loop current limit $I_{LIM}$ SLIC 100 may increase the set subscriber loop current limit $I_{LIM}$ by any suitable amount. SLIC 100 for one embodiment may increase the set subscriber loop current limit $I_{LIM}$ by a predetermined amount that may be fixed for block 218 or that may be dependent, for example, on the current set subscriber loop current limit $I_{LIM}$ SLIC 100 for another embodiment may increase the set subscriber loop current limit $I_{LIM}$ by an amount depending on the extent which the monitored subscriber loop metallic voltage $V_M$ is less than the lower metallic voltage threshold $V_{LTH}$.

SLIC 100 may then control the linefeed on subscriber loop 120 for block 212 such that the subscriber loop current $I_{LOOP}$ is approximately equal to the increased subscriber loop current limit $I_{LIM}$ and continue monitoring the subscriber loop metallic voltage $V_M$ for block 214.

If the monitored subscriber loop metallic voltage $V_M$ is not, for example, less than the lower metallic voltage threshold $V_{LTH}$ for the set range of subscriber loop metallic voltages $V_M$, SLIC 100 for block 220 may identify whether the monitored subscriber loop metallic voltage $V_M$ is greater than the upper metallic voltage threshold $V_{UTH}$ for the set range of subscriber loop metallic voltages $V_M$. Although described as identifying whether the monitored subscriber loop metallic voltage $V_M$ is greater than the upper metallic voltage threshold $V_{UTH}$, SLIC 100 may identify whether the monitored subscriber loop metallic voltage $V_M$ and the upper metallic voltage threshold $V_{UTH}$ satisfy any suitable condition. SLIC 100 for another embodiment may identify whether the monitored subscriber loop metallic voltage $V_M$ is greater than or equal to, is approaching, or is about to exceed the upper metallic voltage threshold $V_{UTH}$.

If the monitored subscriber loop metallic voltage $V_M$ is, for example, greater than the upper metallic voltage threshold $V_{UTH}$ for the set range of subscriber loop metallic voltages $V_M$, SLIC 100 for block 222 decreases the set subscriber loop current limit $I_{LIM}$ SLIC 100 may decrease the set subscriber loop current limit $I_{LIM}$ by any suitable amount. SLIC 100 for one embodiment may decrease the set subscriber loop current limit $I_{LIM}$ by a predetermined amount that may be fixed for block 222 or that may be dependent, for example, on the current set subscriber loop current limit $I_{LIM}$. SLIC 100 for another embodiment may decrease the set subscriber loop current limit $I_{LIM}$ by an amount depending on the extent which the monitored subscriber loop metallic voltage $V_M$ is greater than the upper metallic voltage threshold $V_{UTH}$.

SLIC 100 may then control the linefeed on subscriber loop 120 for block 212 such that the subscriber loop current $I_{LOOP}$ is approximately equal to the decreased subscriber loop current limit $I_{LIM}$ and continue monitoring the subscriber loop metallic voltage $V_M$ for block 214.

SLIC 100 continues controlling the linefeed on subscriber loop 120 for block 212, monitoring the subscriber loop metallic voltage $V_M$ for block 214, and modifying the subscriber loop current limit $I_{LIM}$ for blocks 216-222 to help generate and maintain the subscriber loop metallic voltage $V_M$ in the set range of subscriber loop metallic voltages $V_M$ despite variations in the load on subscriber loop 120. If the monitored subscriber loop metallic voltage $V_M$ is not in the set range after an increase or decrease in the set subscriber loop current limit $I_{LIM}$, SLIC 100 for one embodiment may continue to increase or decrease, respectively, the set subscriber loop current limit $I_{LIM}$ in repeating operations for blocks 212–222 to help modify the monitored subscriber loop metallic voltage $V_M$ to be in the set range of subscriber loop metallic voltages $V_M$.

Figure 2:
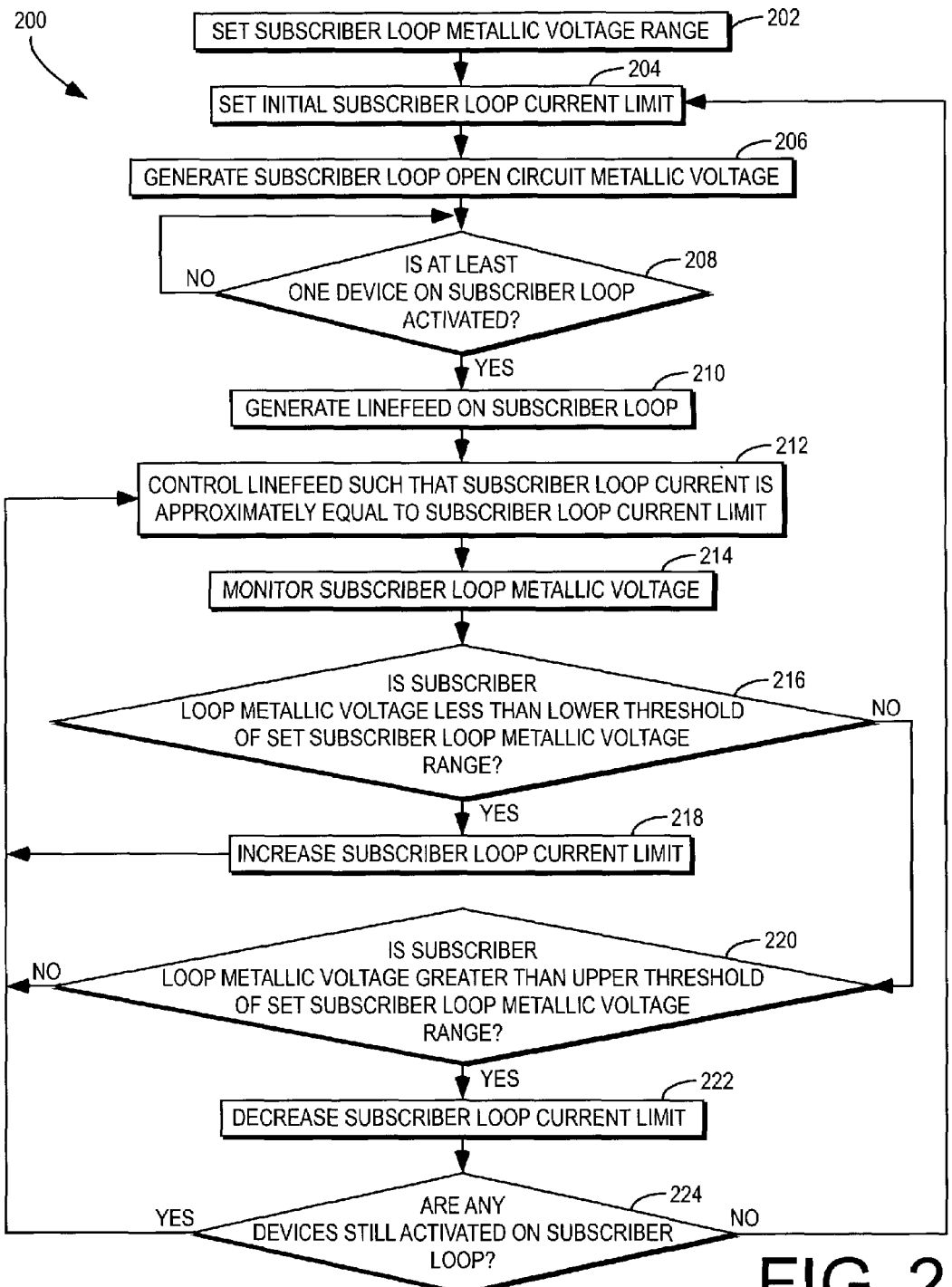
FIG. 2 illustrates, for one embodiment, a flow diagram to generate and control a linefeed on a subscriber loop based on a varying load on the subscriber loop.
Figure 4:
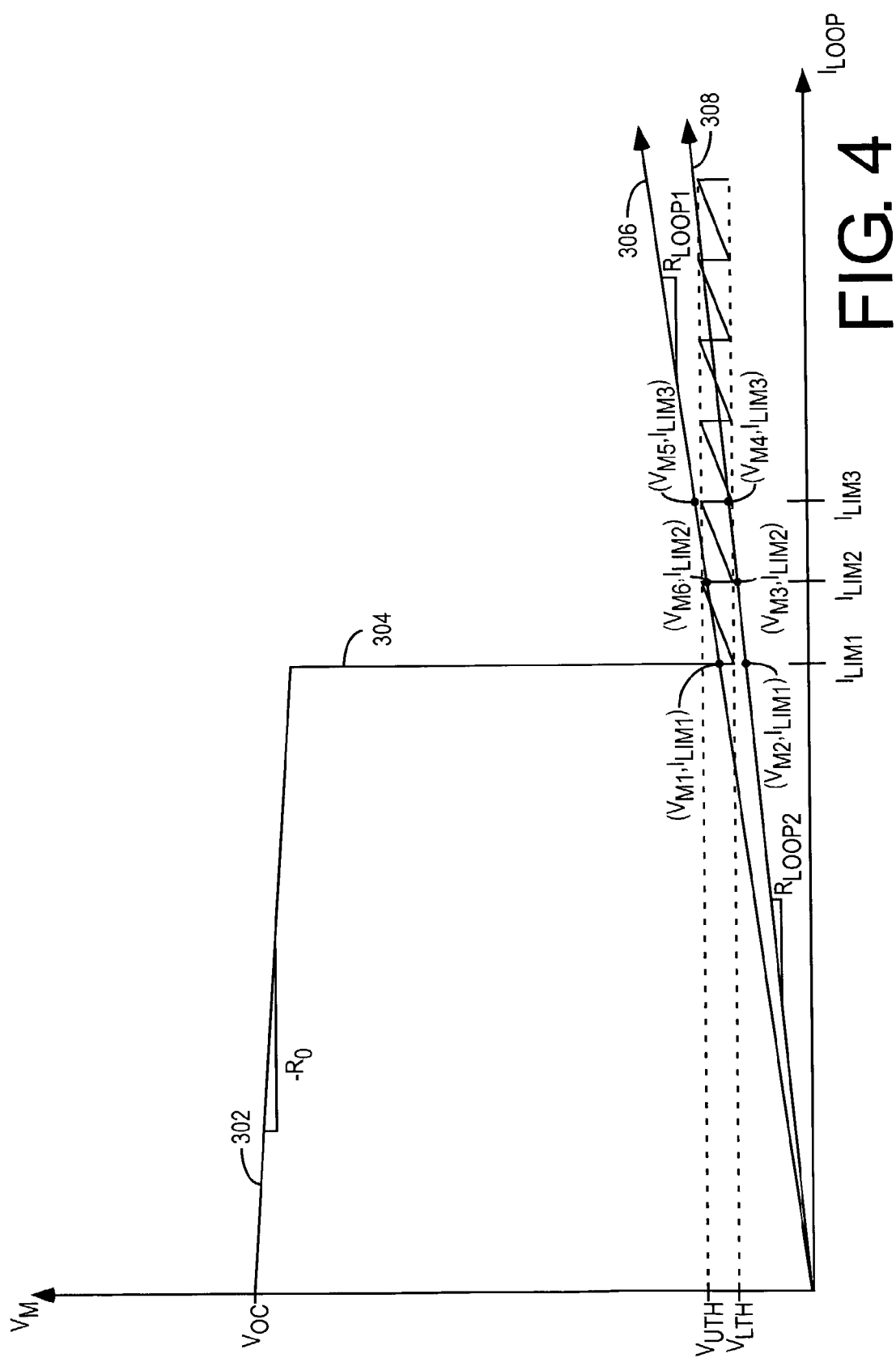
FIG. 4 illustrates, for one embodiment, an adaptive subscriber loop DC linefeed characteristic that accounts for a varying load on a subscriber loop.

FIG. 4 illustrates, for one embodiment, a characteristic of a subscriber loop direct current (DC) linefeed generated by SLIC 100 in accordance with flow diagram 200 of FIG. 2. The linefeed characteristic illustrated in FIG. 4 extends the linefeed characteristic illustrated in FIG. 3 to account for a varying load on subscriber loop 120.

As illustrated in FIG. 4, when only one device 131 is activated on subscriber loop 120, SLIC 100 initially controls the linefeed on subscriber loop 120 for block 212 such that the subscriber loop metallic voltage $V_M$ along curve 304 is approximately equal to $V_{M1}=I_{LIM1}*R_{LOOP1}$. Because the subscriber loop metallic voltage $V_{M1}$ is less than the upper metallic voltage threshold $V_{UTH}$ and greater than the lower metallic voltage threshold $V_{LTH}$, the subscriber loop current $I_{LIM1}$ is considered adequate to power device 131 with reduced or minimized concern for having to dissipate excess power.

When device 132 is activated and increases the load on subscriber loop 120, SLIC 100 controls the linefeed on subscriber loop 120 for block 212 such that the subscriber loop metallic voltage $V_M$ decreases along curve 304 toward $V_{M2}=I_{LIM1}*R_{LOOP2}$. Because the subscriber loop metallic voltage $V_{M2}$ is less than the lower metallic voltage threshold $V_{LTH}$, SLIC 100 increases the set subscriber loop current limit $I_{LIM}$ from the initial current limit $I_{LIM1}$ to a current limit $I_{LIM2}$ and controls the linefeed for block 212 to increase the subscriber loop current $I_{LOOP}$ to approximately the current limit $I_{LIM2}$. Because the subscriber loop metallic voltage $V_{M3}=I_{LIM2}*R_{LOOP2}$ is still less than the lower metallic voltage threshold $V_{LTH}$, SLIC 100 increases the set subscriber loop current limit $I_{LIM}$ from current limit $I_{LIM2}$ to a current limit $I_{LIM3}$ and controls the linefeed for block 212 to increase the subscriber loop current $I_{LOOP}$ to approximately the current limit $I_{LIM3}$. Because the subscriber loop metallic voltage $V_{M4}=I_{LIM3}*R_{LOOP2}$ is less than the upper metallic voltage threshold $V_{UTH}$ and greater than the lower metallic voltage threshold $V_{LTH}$, the subscriber loop current $I_{LIM3}$ is considered adequate to power both devices 131 and 132 with reduced or minimized concern for having to dissipate excess power.

When device 132 is deactivated and decreases the load on subscriber loop 120 while device 131 remains activated, SLIC 100 controls the linefeed on subscriber loop 120 for block 212 such that the subscriber loop metallic voltage $V_M$ increases toward $V_{M5}=I_{LIM3}*R_{LOOP1}$. Because the subscriber loop metallic voltage $V_{M5}$ is greater than the upper metallic voltage threshold $V_{UTH}$, SLIC 100 decreases the set subscriber loop current limit $I_{LIM}$ from current limit $I_{LIM3}$ to current limit $I_{LIM2}$ and controls the linefeed for block 212 to decrease the subscriber loop current $I_{LOOP}$ to approximately the current limit $I_{LIM2}$. Because the subscriber loop metallic voltage $V_{M6}=I_{LIM2}*R_{LOOP1}$ is less than the upper metallic voltage threshold $V_{UTH}$ and greater than the lower metallic voltage threshold $V_{LTH}$, the subscriber loop current $I_{LIM2}$ is considered adequate to power device 131 with reduced or minimized concern for having to dissipate excess power that would otherwise be generated if SLIC 100 maintained the subscriber loop current $I_{LOOP}$ at the higher subscriber loop current limit $I_{LIM3}$ while only device 131 is activated on subscriber loop 120.

If SLIC 100 for block 220 identifies that the monitored subscriber loop metallic voltage $V_M$ is, for example, greater than the upper metallic voltage threshold $V_{UTH}$ and for block 222 decreases the set subscriber loop current limit $I_{LIM}$, SLIC 100 for one embodiment may then identify whether any device 131, 132, and/or 133 is still activated on subscriber loop 120 for block 224. If so, SLIC 100 may then control the linefeed on subscriber loop 120 for block 212 such that the subscriber loop current $I_{LOOP}$ is approximately equal to the decreased subscriber loop current limit $I_{LIM}$ and continue monitoring the subscriber loop metallic voltage $V_M$ for block 214.

SLIC 100 for one embodiment may continue repeating operations for blocks 212-224 until none of devices 131, 132, and 133 are activated on subscriber loop 120 for block 224. SLIC 100 for one embodiment may then reset the subscriber loop current limit $I_{LIM}$ to its initial value $I_{LIM1}$ for block 204, generate a subscriber loop open circuit metallic voltage $V_{OC}$ for block 206, and wait for any device 131, 132, and/or 133 to be activated on subscriber loop 120 for block 208.

SLIC 100 for one embodiment may detect when none of devices 131, 132, and 133 are activated on subscriber loop 120 for block 224. SLIC 100 may, for example, monitor the subscriber loop current $I_{LOOP}$ and/or the subscriber loop metallic voltage $V_M$ to detect when none of devices 131, 132, and 133 are activated on subscriber loop 120.

SLIC 100 may perform operations for blocks 202-224 in any suitable order and may or may not overlap in time the performance of any suitable operation with any other suitable operation. SLIC 100 for another embodiment may, for example, perform operations for blocks 220, 222, and 224 prior to performing operations for blocks 216 and 218. As another example, SLIC 100 for another embodiment may perform operations for blocks 202, 204, and/or 206 in any suitable order. SLIC 100 for another embodiment may monitor subscriber loop 120 for blocks 208, 214, 216, 220, and/or 224 substantially continuously or may monitor subscriber loop 120 for blocks 208, 214, 216, 220 and/or 224 discretely at a suitable sampling rate. SLIC 100 for another embodiment may monitor subscriber loop 120 for blocks 214, 216, 220, and/or 224 while SLIC 100 performs operations for block 212.

SLIC 100 for another embodiment may adaptively control the linefeed on subscriber loop 120 by modifying the set range of subscriber loop metallic voltages $V_M$ as SLIC 100 modifies the subscriber loop current $I_{LOOP}$ based on the monitored load on subscriber loop 120. For one embodiment, SLIC 100 may adaptively control the linefeed on subscriber loop 120 in this manner in accordance with a flow diagram 500 of FIG. 5.

Blocks 502, 504, 506, 508, 510, 512, 514, 516, 518, 520, 522, and 524 of flow diagram 500 generally correspond to blocks 202, 204, 206, 208, 210, 212, 214, 216, 218, 220, 222, and 224 of flow diagram 200, respectively.

For flow diagram 500, however, SLIC 100 for block 502 sets an initial range of subscriber loop metallic voltages $V_M$ that may be modified as SLIC 100 modifies the set subscriber loop current limit $I_{LIM}$ in response to a varying load on subscriber loop 120.

SLIC 100 for block 518 may optionally modify the set range of subscriber loop metallic voltages $V_M$ when SLIC 100 increases the set subscriber loop current limit $I_{LIM}$ in response to identifying for block 516 that the monitored subscriber loop metallic voltage $V_M$ is, for example, less than the lower metallic voltage threshold $V_{LTH}$ for the current set range of subscriber loop metallic voltages $V_M$.

SLIC 100 for block 522 may optionally modify the set range of subscriber loop metallic voltages $V_M$ when SLIC 100 decreases the set subscriber loop current limit $I_{LIM}$ in response to identifying for block 520 that the monitored subscriber loop metallic voltage $V_M$ is, for example, greater than the upper metallic voltage threshold $V_{UTH}$ for the current set range of subscriber loop metallic voltages $V_M$.

When SLIC 100 identifies none of devices 131, 132, and 133 are activated on subscriber loop 120 for block 524, SLIC 100 for one embodiment may then reset the range of subscriber loop metallic voltages $V_M$ to its initial range for block 502.

SLIC 100 may modify the set range of subscriber loop metallic voltages $V_M$ to any range of suitable values in any suitable manner. SLIC 100 for one embodiment may modify the set range of subscriber loop metallic voltages $V_M$ to a range of values as a suitable function of the set subscriber loop current limit $I_{LIM}$.

SLIC 100 for one embodiment may modify the set range of subscriber loop metallic voltages $V_M$ to provide a resistive linefeed by decreasing both the upper metallic voltage threshold $V_{UTH}$ and the lower metallic voltage threshold $V_{LTH}$ as SLIC 100 increases the subscriber loop current $I_{LOOP}$ and by increasing both the upper metallic voltage threshold $V_{UTH}$ and the lower metallic voltage threshold $V_{LTH}$ as SLIC 100 decreases the subscriber loop current $I_{LOOP}$.

SLIC 100 for one embodiment may modify the set range of subscriber loop metallic voltages $V_M$ to provide a linefeed with a hysteresis that is dependent on the subscriber loop current $I_{LOOP}$. SLIC 100 for one embodiment may, for example, decrease the difference between the upper metallic voltage threshold $V_{UTH}$ and the lower metallic voltage threshold $V_{LTH}$ as SLIC 100 increases the subscriber loop current $I_{LOOP}$ and increase the difference between the upper metallic voltage threshold $V_{UTH}$ and the lower metallic voltage threshold $V_{LTH}$ as SLIC 100 decreases the subscriber loop current $I_{LOOP}$.

Figure 5:
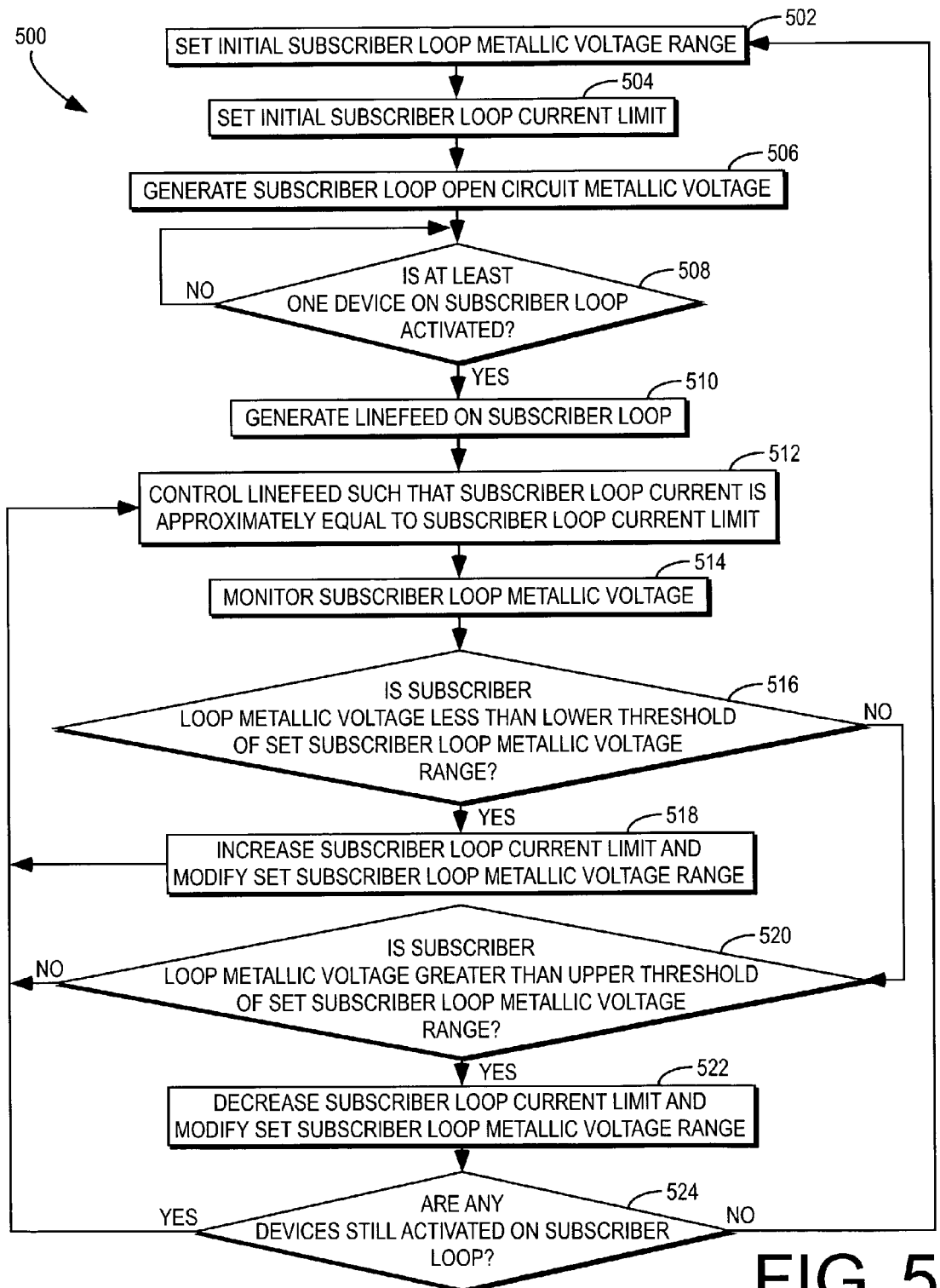
FIG. 5 illustrates, for another embodiment, a flow diagram to generate and control a linefeed on a subscriber loop based on a varying load on the subscriber loop.
Figure 6:
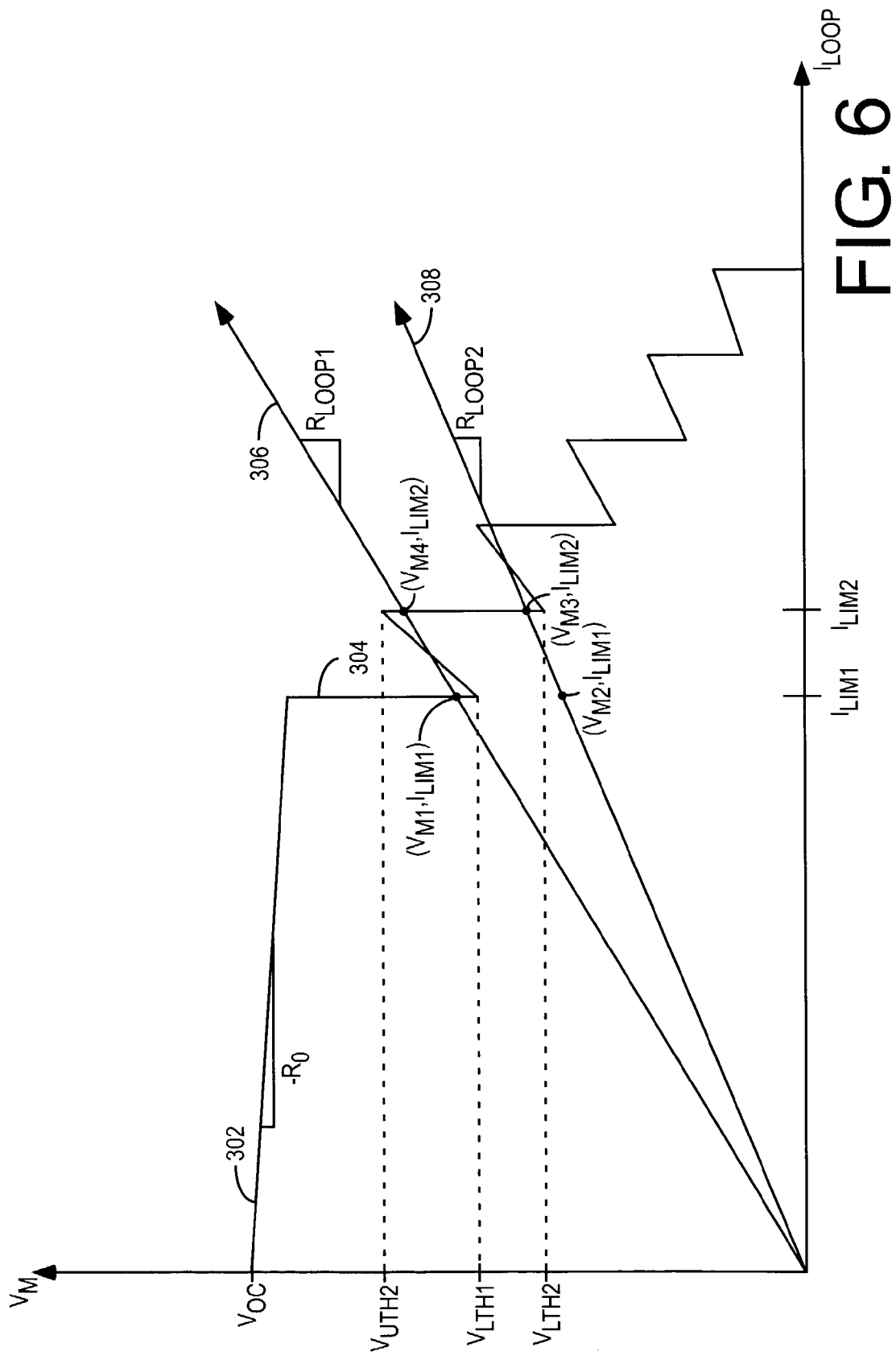
FIG. 6 illustrates, for another embodiment, an adaptive subscriber loop DC linefeed characteristic that accounts for a varying load on a subscriber loop.

FIG. 6 illustrates, for one embodiment, a characteristic of a resistive subscriber loop direct current (DC) linefeed generated by SLIC 100 in accordance with flow diagram 500 of FIG. 5.

As illustrated in FIG. 6, when only one device 131 is activated on subscriber loop 120, SLIC 100 initially controls the linefeed on subscriber loop 120 for block 512 such that the subscriber loop metallic voltage $V_M$ along curve 304 is approximately equal to $V_{M1}=I_{LIM1}*R_{LOOP1}$. Because the subscriber loop metallic voltage $V_{M1}$ is greater than the lower metallic voltage threshold $V_{LTH1}$ of the initial set range of subscriber loop metallic voltages $V_M$, the subscriber loop current $I_{LIM1}$ is considered adequate to power device 131 with reduced or minimized concern for having to dissipate excess power. The initial set range of subscriber loop metallic voltages $V_M$ may have any suitable upper metallic voltage threshold $V_{UTH1}$, such as the subscriber loop open circuit metallic voltage $V_{OC}$ for example.

When device 132 is activated and increases the load on subscriber loop 120, SLIC 100 controls the linefeed on subscriber loop 120 for block 512 such that the subscriber loop metallic voltage $V_M$ decreases along curve 304 toward $V_{M2}=I_{LIM1}*R_{LOOP2}$. Because the subscriber loop metallic voltage $V_{M2}$ is less than the lower metallic voltage threshold $V_{LTH1}$, SLIC 100 increases the set subscriber loop current limit $I_{LIM}$ from the initial current limit $I_{LIM1}$ to a current limit $I_{LIM2}$, modifies the set range of subscriber loop metallic voltages $V_M$ by decreasing the upper metallic voltage threshold $V_{UTH1}$ to $V_{UTH2}$ and decreasing the lower metallic voltage threshold $V_{LTH1}$ to $V_{LTH2}$, and controls the linefeed for block 512 to increase the subscriber loop current $I_{LOOP}$ to approximately the current limit $I_{LIM2}$. Because the subscriber loop metallic voltage $V_M=I_{LIM2}*R_{LOOP2}$ is less than the upper metallic voltage threshold $V_{UTH2}$ and greater than the lower metallic voltage threshold $V_{LTH2}$, the subscriber loop current $I_{LIM2}$ is considered adequate to power both devices 131 and 132 with reduced or minimized concern for having to dissipate excess power.

When device 132 is deactivated and decreases the load on subscriber loop 120 while device 131 remains activated, SLIC 100 controls the linefeed on subscriber loop 120 for block 512 such that the subscriber loop metallic voltage $V_M$ increases toward $V_{M4}=I_{LIM2}*R_{LOOP1}$. Because the subscriber loop metallic voltage $V_{M4}$ is less than the upper metallic voltage threshold $V_{UTH2}$ and greater than the lower metallic voltage threshold $V_{LTH2}$, the subscriber loop current $I_{LIM2}$ is considered adequate to power device 131.

SLIC 100 for one embodiment may be designed for digital control of a resistive linefeed in accordance with flow diagram 500 of FIG. 5 and therefore may be manufactured in a repeatable manner and perform voice impedance synthesis with relatively fewer perturbations.

Although described as identifying a relationship between the subscriber loop metallic voltage $V_M$ and a range of subscriber loop metallic voltages $V_M$ and modifying the subscriber loop current limit $I_{LIM}$ and/or the range of subscriber loop metallic voltages $V_M$ to help generate and maintain the subscriber loop metallic voltage $V_M$ in a desired range of subscriber loop metallic voltages $V_M$, SLIC 100 for one embodiment may similarly identify a relationship between the subscriber loop metallic voltage $V_M$ and a single target or threshold metallic voltage $V_T$ and may modify the subscriber loop current limit $I_{LIM}$ and/or the target or threshold metallic voltage $V_T$ to help generate and maintain the subscriber loop metallic voltage $V_M$ at or around a desired target or threshold metallic voltage $V_T$ despite variations in the load on subscriber loop 120.

Circuitry for Adaptive Linefeed Control

SLIC 100 may comprise any suitable circuitry to generate and control the linefeed on subscriber loop 120 based on a varying load on subscriber loop 120.

Figure 7:
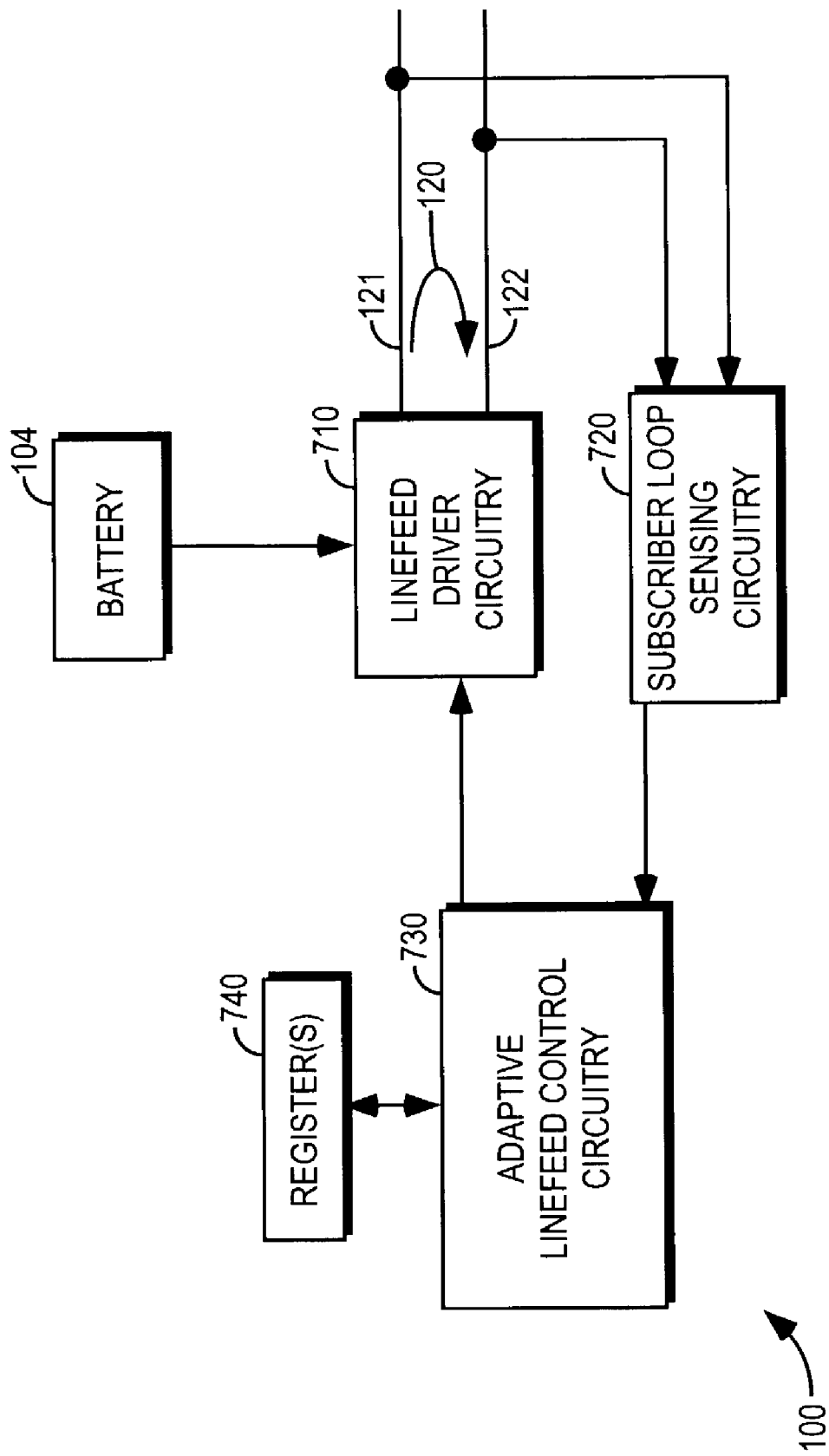
FIG. 7 illustrates, for one embodiment, circuitry for a SLIC to generate and control a linefeed on a subscriber loop based on a varying load on the subscriber loop.

As illustrated in FIG. 7, SLIC 100 for one embodiment may comprise linefeed driver circuitry 710, subscriber loop sensing circuitry 720, adaptive linefeed control circuitry 730, and one or more programmable registers 740.

Linefeed driver circuitry 710 is coupled to first line 121 and to second line 122 of subscriber loop 120 to generate and maintain a linefeed on subscriber loop 120. Linefeed driver circuitry 710 for one embodiment comprises a current source to generate and maintain a linefeed on subscriber loop 120. Linefeed driver circuitry 710 for another embodiment may generate and maintain a suitable metallic voltage $V_M$ for subscriber loop 120 to generate and maintain a linefeed on subscriber loop 120. Linefeed driver circuitry 710 is coupled to battery 104 to receive power and has one or more inputs coupled to one or more outputs of adaptive linefeed control circuitry 730 to receive one or more linefeed control signals from adaptive linefeed control circuitry 730 to control the linefeed on subscriber loop 120. Linefeed driver circuitry 710 may comprise any suitable analog and/or digital circuitry.

Subscriber loop sensing circuitry 720 is coupled to first line 121 and to second line 122 of subscriber loop 120 to sense the voltage on first line 121, the voltage on second line 122, the subscriber loop metallic voltage $V_M$ between first line 121 and second line 122, and/or the subscriber loop current $I_{LOOP}$ on subscriber loop 120. Subscriber loop sensing circuitry 720 has one or more outputs coupled to one or more inputs of adaptive linefeed control circuitry 730 to output the sensed first line voltage, the sensed second line voltage, the sensed subscriber loop metallic voltage $V_M$, and/or the sensed subscriber loop current $I_{LOOP}$ to adaptive linefeed control circuitry 730. Subscriber loop sensing circuitry 720 may comprise any suitable analog and/or digital circuitry.

Subscriber loop sensing circuitry 720 may sense the first line voltage, the second line voltage, the subscriber loop metallic voltage $V_M$, and/or the subscriber loop current $I_{LOOP}$ in any suitable manner at any suitable rate. Subscriber loop sensing circuitry 720 for one embodiment may sense the subscriber loop metallic voltage $V_M$ directly or by identifying the difference between the sensed first line voltage and the sensed second line voltage. Subscriber loop sensing circuitry 720 may sense the first line voltage, the second line voltage, the subscriber loop metallic voltage $V_M$, and/or the subscriber loop current $I_{LOOP}$ substantially continuously, at predetermined intervals, or sporadically, for example.

Adaptive linefeed control circuitry 730 has one or more inputs coupled to one or more outputs of register(s) 740 to receive one or more values that may be used to identify, for example, one or more upper metallic voltage thresholds $V_{UTH}$, one or more lower metallic voltage thresholds $V_{LTH}$, an initial subscriber loop current limit $I_{LIM1}$, and/or a subscriber loop open circuit voltage $V_{OC}$. Adaptive linefeed control circuitry 730 also has one or more inputs coupled to one or more outputs of subscriber loop sensing circuitry 720 to receive a sensed first line voltage, a sensed second line voltage, a sensed subscriber loop metallic voltage $V_M$, and/or a sensed subscriber loop current $I_{LOOP}$. Adaptive linefeed control circuitry 730 has one or more outputs coupled to one or more inputs of linefeed driver circuitry 710 to transmit one or more linefeed control signals to control the linefeed on subscriber loop 120. Adaptive linefeed control circuitry 730 may comprise any suitable analog and/or digital circuitry.

Adaptive linefeed control circuitry 730 for one embodiment transmits one or more linefeed control signals to control the linefeed on subscriber loop 120 based on the identified upper metallic voltage threshold(s) $V_{UTH}$, lower metallic voltage threshold(s) $V_{LTH}$, initial subscriber loop current limit $I_{LIM1}$, subscriber loop open circuit metallic voltage $V_{OC}$, sensed first line voltage, sensed second line voltage, sensed subscriber loop metallic voltage $V_M$, and/or sensed subscriber loop current $I_{LOOP}$ in accordance with flow diagram 200 of FIG. 2 or with flow diagram 500 of FIG. 5. Adaptive linefeed control circuitry 730 for one embodiment may receive a sensed subscriber loop metallic voltage $V_M$ from subscriber loop sensing circuitry 720 to monitor the subscriber loop metallic voltage $V_M$ for block 214 of flow diagram 200 or block 514 of flow diagram 500 or may receive a sensed first line voltage and a sensed second line voltage from subscriber loop sensing circuitry 720 and identify the difference between the sensed first line voltage and the sensed second line voltage to monitor the subscriber loop metallic voltage $V_M$ for block 214 or block 514.

Figure 8:
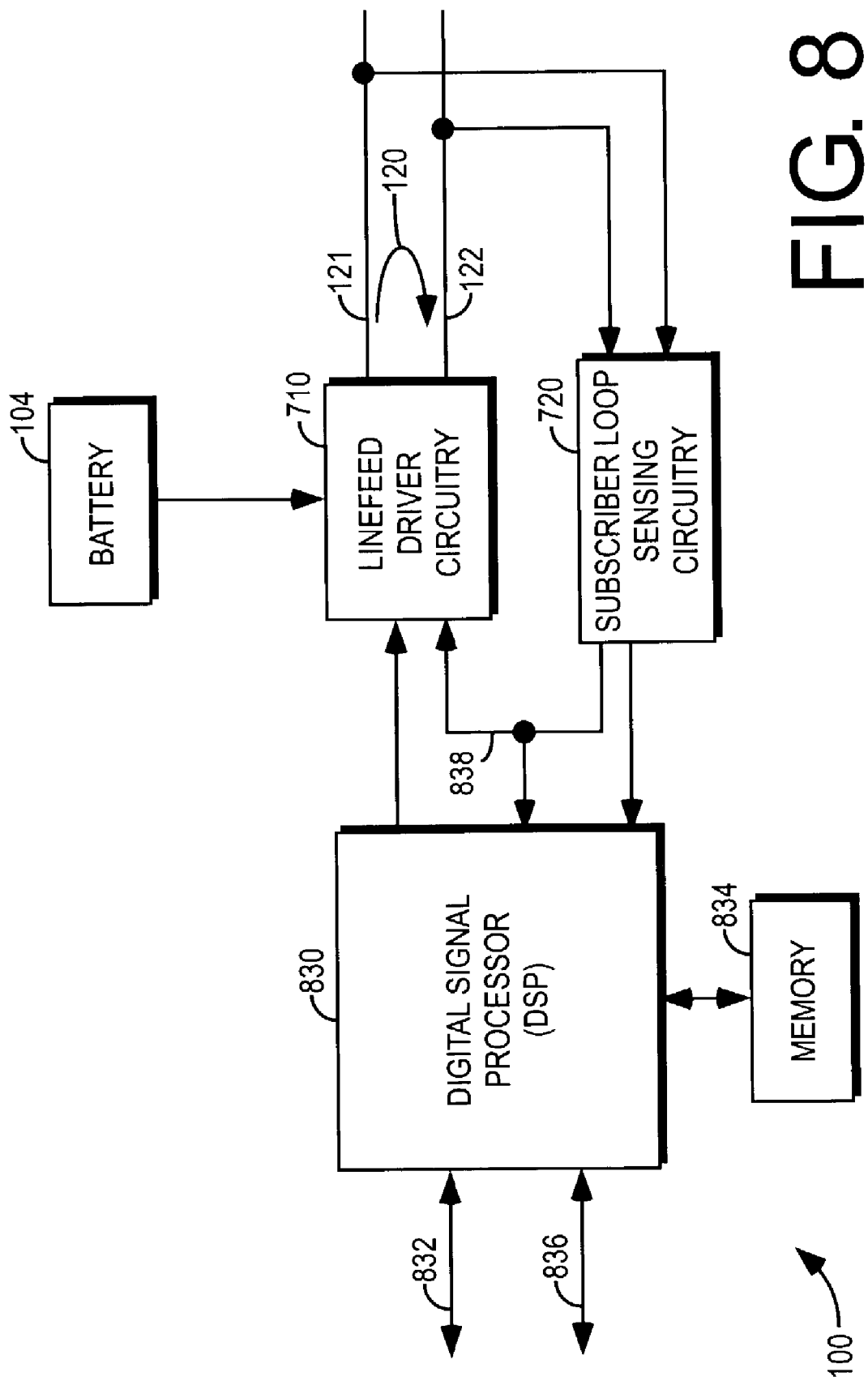
FIG. 8 illustrates, for one embodiment, circuitry for a SLIC to generate and control a linefeed on a subscriber loop based on a varying load on the subscriber loop.

Adaptive linefeed control circuitry 730 and programmable register(s) 740 for one embodiment may be implemented using a digital signal processor (DSP) 830 as illustrated in FIG. 8. DSP 830 for one embodiment has a DSP interface 832 to allow DSP 830 to be controlled or programmed to adaptively control the linefeed on subscriber loop 120 in performing the battery feed function to account for variations in load on subscriber loop 120. DSP 830 for one embodiment may also be controlled or programmed to help perform one or more other functions, such as one or more other BORSCHT functions in addition to the battery feed function. DSP interface 832 may also be used to program one or more values in one or more registers in DSP 830 to set one or more control parameters for one or more functions performed by DSP 830.

SLIC 100 for one embodiment may also comprise optional memory 834 to store suitable instructions to be executed by DSP 830 to adaptively control the linefeed on subscriber loop 120 in performing the battery feed function to account for variations in load on subscriber loop 120. Memory 834 may be used to store, for example, suitable instructions to adaptively control the linefeed on subscriber loop 120 in accordance with flow diagram 200 of FIG. 2 or with flow diagram 500 of FIG. 5.

Memory 834 for one embodiment may also be used to store suitable instructions to be executed by DSP 830 to perform one or more other functions, such as one or more other BORSCHT functions in addition to the battery feed function. Memory 834 for one embodiment may also be used to store one or more suitable values for one or more control parameters for one or more functions performed by DSP 830.

Memory 834 may comprise any suitable one or more non-volatile and/or volatile memories including, for example, flash memory, read only memory (ROM), programmable read only memory (PROM), erasable programmable read only memory (EPROM), electrically erasable programmable read only memory (EEPROM), a battery-backed random access memory (RAM), random access memory (RAM), static random access memory (SRAM), dynamic random access memory (DRAM), and/or synchronous dynamic random access memory (SDRAM).

Although described in the context of instructions stored in memory 834 to be executed by DSP 830, any suitable machine-executable instructions to adaptively control a linefeed on a subscriber loop to account for variations in load on the subscriber loop may be stored on any suitable machine-readable medium, such as a hard disk device, a floppy disk or diskette device, an optical disk device such as a compact disc (CD) or digital versatile disc (DVD) device for example, a Bernoulli disk device such as a Jaz or Zip disk device for example, a flash memory device, a file server device, and/or any other suitable memory device. For one embodiment, suitable instructions stored in this manner may be transmitted to SLIC 100 through DSP interface 832 for execution by DSP 830 and/or for storage in memory 834.

DSP 830 for one embodiment may also have a digital voiceband interface 836 to communicate digitized voiceband data to switching network 110 where switching network 110 is a digital switching network and have a digital voiceband interface 838 coupled to linefeed driver circuitry 710 and to subscriber loop sensing circuitry 720 for bi-directional voiceband data transfer between DSP 830 and subscriber loop 120.

DSP 830 for one embodiment is implemented on an integrated circuit. At least a portion of linefeed driver circuitry 710 and/or subscriber loop sensing circuitry 720 for one embodiment may also be implemented on the integrated circuit.

SLIC 100 for one embodiment may be implemented by programming or controlling any suitable SLIC architecture, including a suitable existing SLIC architecture, to adaptively control a linefeed on a subscriber loop to account for variations in load on the subscriber loop. As one example, SLIC 100 may be implemented by controlling an Si321x ProSLIC™ Programmable CMOS SLIC/Codec with Ringing and Battery Voltage Generation, manufactured by Silicon Laboratories, Inc. of Austin, Tex., to adaptively control a linefeed on a subscriber loop to account for variations in load on the subscriber loop.

In the foregoing description, one or more embodiments of the present invention have been described. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method comprising:
   a. providing a subscriber loop with an initial current selected from a plurality of pre-determined currents while a subscriber loop metallic voltage ranges between an associated upper voltage threshold and an associated lower voltage threshold; and
   b. providing the subscriber loop with another current selected from the plurality of pre-determined currents if the metallic voltage reaches the associated upper or lower voltage thresholds, wherein each of the plurality of pre-determined currents has the same associated upper voltage threshold and the same associated lower voltage threshold.

2. The method of claim 1 wherein the another current is greater than the initial current if the metallic voltage reaches the lower voltage threshold.

3. The method of claim 1 wherein the another current is less than the initial current if the metallic voltage reaches the upper voltage threshold.

4. The method of claim 1 wherein the provided current is substantially constant while the metallic voltage remains between the associated upper and lower voltage thresholds.

5. The method of claim 1 wherein the plurality of pre-determined currents is greater than 2.

6. A method comprising:
 a. providing a subscriber loop with an initial current selected from a plurality of pre-determined currents; and
 b. providing the subscriber loop with another current selected from the plurality of pre-determined currents if a metallic voltage of the subscriber loop reaches a lower voltage threshold, wherein the another current is greater than the initial current, wherein the lower voltage threshold is the same for each of the plurality of pre-determined currents.

7. The method of claim 6 wherein the current provided to the subscriber loop is substantially constant as long as the metallic voltage remains between the associated upper and lower voltage thresholds.

8. The method of claim 6 wherein the plurality of pre-determined currents is greater than 2.

9. A method comprising:
 a. providing a subscriber loop with an initial current selected from a plurality of pre-determined currents; and
 b. providing the subscriber loop with another current selected from the plurality of pre-determined currents if a metallic voltage of the subscriber loop reaches an upper voltage threshold, wherein the another current is less than the initial current, wherein the upper voltage threshold is the same for each of the plurality of pre-determined currents.

10. The method of claim 9 wherein the current provided to the subscriber loop is substantially constant as long as the metallic voltage remains between the associated upper and lower voltage thresholds.

11. The method of claim 9 wherein the plurality of pre-determined currents is greater than 2.

12. A subscriber loop linefeed apparatus, comprising:
 a linefeed driver providing a subscriber loop with a current; and
 adaptive linefeed control circuitry controlling the linefeed driver to provide an initial current selected from a plurality of pre-determined currents while a subscriber loop metallic voltage is between an associated upper voltage threshold and an associated lower voltage threshold, wherein the linefeed driver is controlled to provide another current selected from the plurality of currents if the metallic voltage reaches the associated upper or lower voltage thresholds, wherein each of the plurality of currents has the same associated upper and lower voltage thresholds.

13. The apparatus of claim 12, wherein the another current is greater than the initial current if the metallic voltage reaches the lower voltage threshold.

14. The apparatus of claim 12, wherein the another current is less than the initial current if the metallic voltage reaches the upper voltage threshold.

15. The apparatus of claim 12 further comprising:
 registers for storing values identifying the initial current and the associated upper and lower voltage thresholds.

16. The apparatus of claim 12 further comprising:
 sensing circuitry detecting the metallic voltage.

17. The apparatus of claim 12 wherein the plurality of pre-determined currents is greater than 2.

18. The apparatus of claim 12 wherein the adaptive linefeed control circuitry comprises a digital signal processor.

* * * * *